US008802330B2

(12) United States Patent
Lee et al.

(10) Patent No.: US 8,802,330 B2
(45) Date of Patent: Aug. 12, 2014

(54) METHOD FOR MANUFACTURING COMPOSITE SEPARATOR FOR FUEL CELL AND COMPOSITE SEPARATOR MANUFACTURED BY THE SAME

(75) Inventors: Dai Gil Lee, Daejeon (KR); Ha Na Yu, Gyeongsangbuk-do (KR); Byoung Chul Kim, Daejeon (KR); Bu Gi Kim, Gwangju (KR); Jun Woo Lim, Daejeon (KR); Jung Do Suh, Seoul (KR); Byung Ki Ahn, Gyeonggi-do (KR); Sae Hoon Kim, Gyeonggi-do (KR)

(73) Assignees: Hyundai Motor Company, Seoul (KR); Korea Advanced Institute of Science and Technology, Daejeon (KR)

( * ) Notice: Subject to any disclaimer, the term of this patent is extended or adjusted under 35 U.S.C. 154(b) by 429 days.

(21) Appl. No.: 12/876,718

(22) Filed: Sep. 7, 2010

(65) Prior Publication Data
US 2011/0281203 A1    Nov. 17, 2011

(30) Foreign Application Priority Data

May 11, 2010    (KR) ......................... 10-2010-0043715

(51) Int. Cl.
*H01M 8/02*    (2006.01)
(52) U.S. Cl.
USPC .......................................... 429/535; 429/518
(58) Field of Classification Search
USPC .................................. 429/535, 518
See application file for complete search history.

(56) References Cited

U.S. PATENT DOCUMENTS

| 2004/0253505 A1* | 12/2004 | Blunk et al. ................... 429/44 |
| 2005/0048347 A1* | 3/2005 | Takashita et al. ............ 429/34 |
| 2005/0112442 A1* | 5/2005 | Wells et al. ................... 429/34 |

FOREIGN PATENT DOCUMENTS

| JP | 08148169 A | 6/1996 |
| JP | 2007-280615 A | 10/2007 |
| KR | 10-2004-0001977 A | 1/2004 |
| KR | 10-2004-0103960 A | 12/2004 |
| KR | 10-2005-0009377 | 1/2005 |
| KR | 10-2006-0083204 | 7/2006 |
| KR | 10-2008-0045455 | 5/2008 |
| KR | 10-0834057 B1 | 5/2008 |

* cited by examiner

*Primary Examiner* — Ula C Ruddock
*Assistant Examiner* — Frank Chernow
(74) *Attorney, Agent, or Firm* — Edwards Wildman Palmer LLP; Peter F. Corless

(57) ABSTRACT

The present invention provides a method for manufacturing a composite separator for a fuel cell, which can reduce the electrical contact resistance by performing an additional post-treatment to remove residual resin remaining on the surface of the composite separator by plasma etching. In certain preferred embodiments, the present invention provides a method for manufacturing a composite separator for a fuel cell, in which a liquid phase resin for gasket is applied to the surface of the composite separator along a predetermined gasket pattern, or a semi-cured resin for gasket in the form of a film with a predetermined gasket pattern is stacked on the surface of the composite separator, and then plasma etching is performed to remove the residual resin and, at the same time, cure the resin for gasket, thus reducing the overall processing time to improve the productivity and preventing a composite material of the separator from being damaged.

4 Claims, 8 Drawing Sheets

(a)　　　　　　　　(b)　　　　　　　　(c)

METHOD FOR MANUFACTURING COMPOSITE SEPARATOR FOR FUEL CELL AND COMPOSITE SEPARATOR MANUFACTURED BY THE SAME

CROSS-REFERENCE TO RELATED APPLICATION

This application claims under 35 U.S.C. §119(a) the benefit of Korean Patent Application No. 10-2010-0043715 filed May 11, 2010, the entire contents of which are incorporated herein by reference.

BACKGROUND (a) Technical Field

The present disclosure relates, in general, to a separator for a fuel cell. More particularly, it relates to a carbon fiber reinforced composite separator for a polymer electrolyte membrane fuel cell and a method for manufacturing the same.

(b) Background Art

In general, a polymer electrolyte membrane fuel cell (PEMFC) is a device that generates electricity with heat and water by an electrochemical reaction between hydrogen and oxygen (or air) as reactant gases. The PEMFC has certain advantages such as high energy efficiency, high current density, high power density, short start-up time, and rapid response to a load change as compared to the other types of fuel cells. Accordingly, it can be used in various applications such as a power source for zero-emission vehicles, an independent power plant, a portable power source, a military power source, etc.

The configuration of a fuel cell stack is described with reference to FIG. 1 below.

In a typical fuel cell stack, a membrane-electrode assembly (MEA) is positioned in the center of each unit cell of the fuel cell stack. The MEA comprises a solid polymer electrolyte membrane 60, through which hydrogen ions (protons) are transported, and catalyst layers 61 including a cathode and an anode, which are coated on both surfaces of the electrolyte membrane 60.

Preferably, a gas diffusion layer (GDL) 40 and a gasket 41 are sequentially stacked on the outside of the electrolyte membrane 10, i.e., on the surface where the cathode and the anode are positioned. A separator (also called a bipolar plate) 30 including flow fields for supplying fuel and discharging water produced by the reaction is stacked on the outside of the GDL 40. Further, end plates 50 for supporting the above-described elements are suitably connected to the both outermost ends.

An oxidation reaction of hydrogen occurs at the anode of the fuel cell to produce hydrogen ions (protons) and electrons, and the produced hydrogen ions and electrons are transmitted to the cathode through the electrolyte membrane and the separator, respectively. At the cathode, the hydrogen ions and electrons transmitted from the anode through the electrolyte membrane and the separator react with oxygen in air to produce water. Here, electrical energy is generated by the flow of the electrons through an external conducting wire due to the transfer of the hydrogen ions, and at this time, heat and water are produced by the electrochemical reaction.

In the above-described fuel cell stack, the separator separates the respective unit cells of the fuel cell and, at the same time, serves as a current path between the unit cells, and the flow fields formed in the separator serve as paths for supplying hydrogen and oxygen and discharging water produced by the reaction.

Since the water produced by the reaction inhibits the chemical reaction occurring on the catalyst layers of the fuel cell, the water should be rapidly discharged to the outside, and therefore the separator material may have high surface energy such that the water is rapidly spread on the surface of the separator (hydrophilicity) or may have low surface energy such that the water rolls down the surface of the separator (hydrophobicity).

In particular, it is necessary to minimize the electrical contact resistance between the separators. Conventionally, the separator is formed of graphite, thin stainless steel, or a composite material in which expanded carbon particles or graphite particles are mixed with a polymer matrix. Recently, an attempt to prepare a composite separator using continuous carbon fibers has been made.

Accordingly, research aimed at developing a continuous carbon fiber composite separator which can improve the electrical, chemical, and mechanical properties has continued to progress, and a method for reducing the electrical contact resistance between the unit cells, which is an important electrical property, has been studied.

Korean Patent Publication No. 10-2009-0112771, incorporated by reference in its entirety herein, discloses a continuous carbon fiber composite separator and a method for manufacturing the same. According to this method, the separator is manufactured using a continuous carbon fiber composite and, at this time, a hot press or hot roller having positive and negative flow field patterns is used to form hydrogen, air, and coolant flow fields, thereby manufacturing a separator having excellent impact strength, moldability, chemical resistance, and flexural strength, compared to the existing separators formed of other materials.

FIG. 2 is a process diagram showing a method for manufacturing a composite separator disclosed in the above-referenced patent. As shown in the figure, a raw material 10 of a continuous carbon-fiber composite having a continuous fiber structure, in which carbon fibers are surrounded by a polymer binder, is wound on a roll 12. Here, the raw material 10 of the continuous carbon-fiber composite is provided as a prepreg in the form of a semi-cured sheet or as a sheet molding compound (SMC) in a semi-cured state.

Next, the raw material 10 of the continuous carbon-fiber composite is passed through a plurality of cutting rollers 18 in the form of a long roll including a cutter 16 provided on the surface thereof such that the raw material 10 is cut along the length of a separator and, at the same time, a common distribution manifold and an assembly hole are formed on the raw material 10.

Subsequently, a plurality of raw materials 10 cut along the length of the separator is continuously passed through a stacking/compression roller 20 or a plurality of raw materials 10 cut along the length of the separator is arranged in a zigzag manner such as 0°/90°/0° and then passed through the stacking/compression roller 20.

Then, the stacked raw materials 10 are placed on a high temperature hot press 22 to be press-molded or passed through a high temperature hot roller to be press-molded, heated, and partially cured.

Here, positive and negative flow field patterns 24 for forming hydrogen, air, and coolant flow fields are provided on the surface of the high temperature hot press 22 and the high temperature hot roller. Accordingly, the hydrogen, air, and coolant flow fields are formed on the raw material 10 by the press molding of the high temperature hot press 22 or the high temperature hot roller.

Next, a trimming process is performed to remove unnecessary portions from the heated and press-molded separator using a trim cutter 26. The trimming process is performed within a minimum period of time so that the heated and press-molded raw material 10 has a curing degree that can maintain its shape.

Lastly, a post-curing process, in which several hundreds of separators are placed in an autoclave at a time to be heat-treated, is performed so that the separators are finally cured.

Therefore, according to the above-described method, it is possible to manufacture the continuous carbon fiber composite separator by a continuous process for mass production, and it is possible to provide a separator having excellent mechanical and chemical resistance properties.

However, residual resin remains on the surface of the continuous carbon fiber composite separator manufactured in the above-described manner, and it may increase the electrical contact resistance between the composite separator and GDL, thereby reducing the efficiency of the fuel cell due to ohmic loss.

Moreover, a process for bonding a gasket for maintaining airtightness to the thus manufactured composite separator is an obstacle to produce it because the process may either increase processing time or thermally damage the composite separator.

That is, in the case where a solid gasket is bonded to the separator using adhesive, the processing time is increased, and this results in reduced productivity. In the case where a liquid phase resin for gasket is injected onto the surface of the separator, the liquid phase resin for gasket is exposed to a temperature of 250 to 300° C. for a long time to be cured, during which the composite material of the separator may be damaged.

Accordingly, there is a need in the art for new methods for manufacturing a composite separator for a fuel cell.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a method for manufacturing a composite separator for a fuel cell, which can reduce the electrical contact resistance by performing an additional post-treatment to remove residual resin remaining on the surface of the composite separator, which is manufactured by an ordinary composite forming process, followed by plasma etching.

In certain preferred embodiments, the present invention provides a method for manufacturing a composite separator for a fuel cell, in which a liquid phase resin for gasket is suitably applied to the surface of the composite separator along a predetermined gasket pattern, or a semi-cured resin for gasket in the form of a film with a predetermined gasket pattern is stacked on the surface of the composite separator, and then plasma etching is performed to remove the residual resin and, at the same time, cure the resin for gasket, thus reducing the overall processing time to improve the productivity and preventing a composite material of the separator from being damaged.

In a preferred embodiment, the present invention provides a method for manufacturing a carbon reinforced composite separator for a fuel cell, the composite separator preferably containing a polymer resin as a matrix and reinforced with a carbon material, the method comprising performing a post-treatment to expose the carbon material from the surface of the carbon reinforced composite separator and remove residual resin used as the matrix from the surface of the separator by performing plasma etching on the surface of the separator in plasma equipment.

In another preferred embodiment, the plasma etching may be performed after stacking a resin for gasket on the surface of the carbon reinforced composite separator along a predetermined gasket pattern, where a gasket for maintaining airtightness is to be suitably positioned, such that the resin for the gasket is suitably cured by plasma energy together with the removal of the residual resin.

In another preferred embodiment, the plasma etching may be performed after applying a liquid phase resin for gasket to the surface of the carbon reinforced composite separator along the gasket pattern such that the resin for gasket is cured.

In still another preferred embodiment, the plasma etching may be suitably performed after stacking a semi-cured resin for gasket in the form of a film with a predetermined gasket pattern on the surface of the carbon reinforced composite separator such that the resin for gasket is completely cured.

In yet another preferred embodiment, the carbon material may preferably include at least one selected from the group consisting of continuous carbon fiber, chopped carbon fibers, carbon nanotubes, and carbon black.

In another aspect, the present invention provides a composite separator for a fuel cell manufactured by the above-described method.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
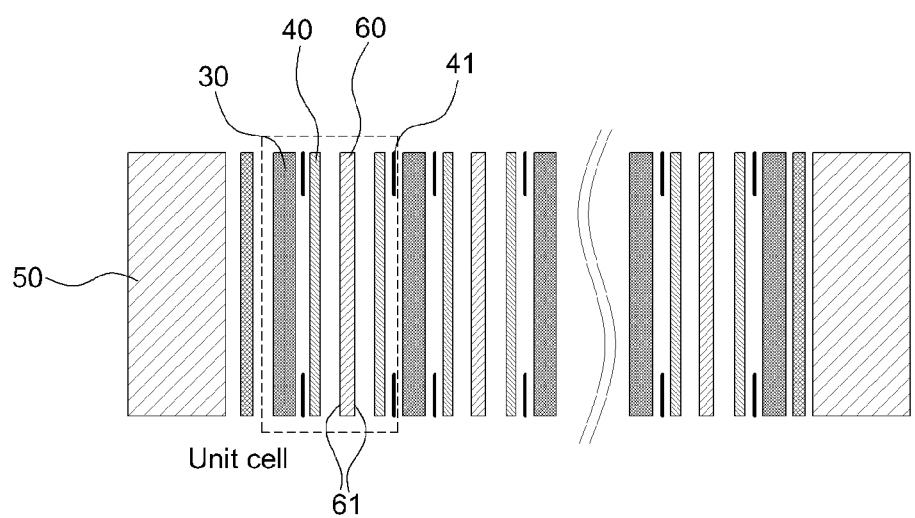
FIG. 1 is a schematic diagram showing the configuration of a fuel cell stack according to the prior art.
Figure 2:
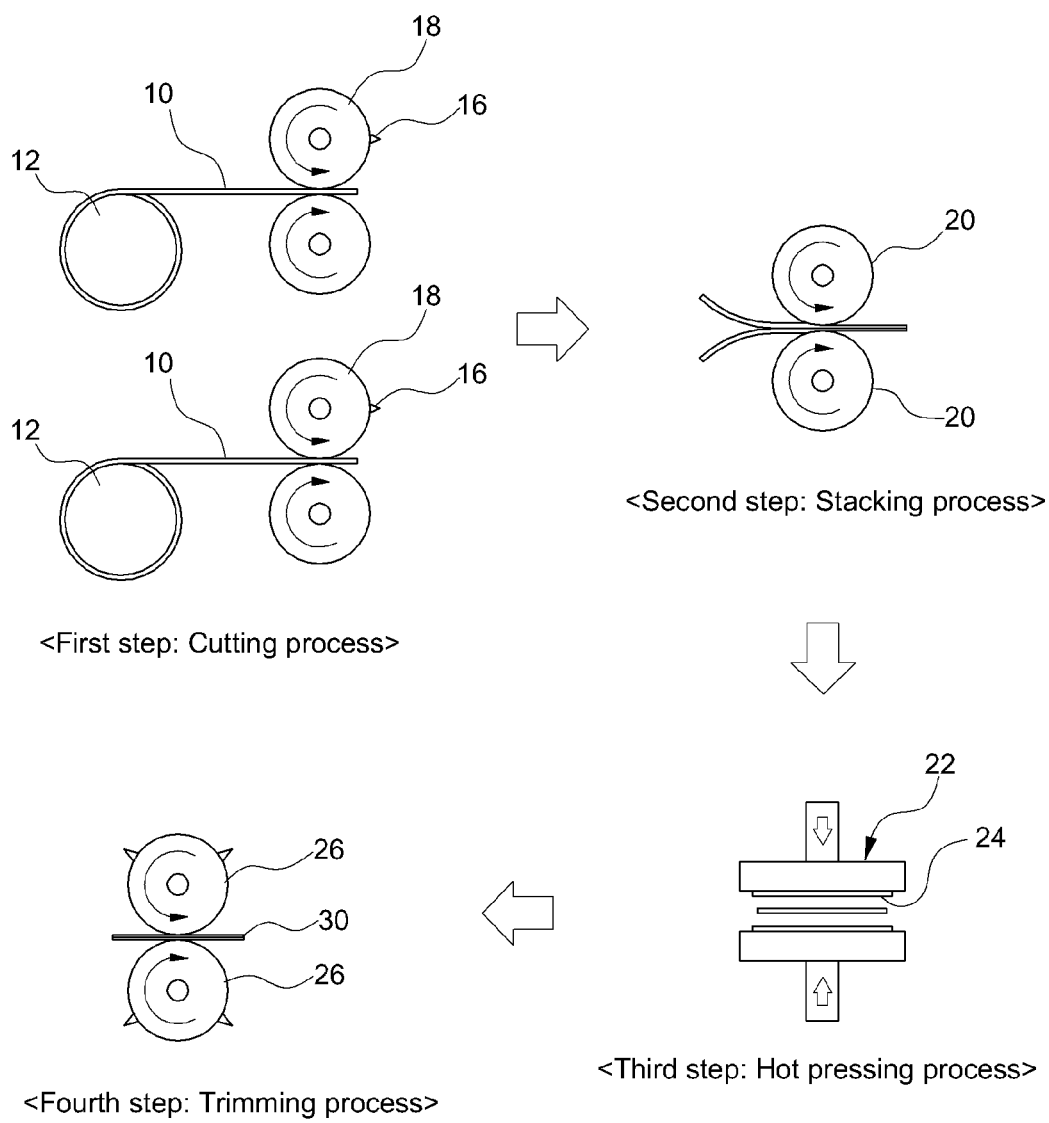
FIG. 2 is a process diagram showing a conventional method for manufacturing a continuous carbon fiber composite separator.

Reference numerals set forth in the Drawings includes reference to the following elements as further discussed below:

| | |
|---|---|
| 110: separator | 111: polymer matrix |
| 112: carbon material | 113a: liquid phase resin for gasket |
| 113b: semi-cured resin for gasket | 113c: completely-cured resin for gasket |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention features a method for manufacturing a carbon reinforced composite separator for a fuel cell, the composite separator containing a polymer resin as a matrix and reinforced with a carbon material, the method comprising performing a post-treatment by performing plasma etching on the surface of the separator in plasma equipment.

In one embodiment, the plasma etching post-treatment is performed to expose the carbon material from the surface of the carbon reinforced composite separator and remove residual resin used as the matrix from the surface of the separator.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

According to preferred embodiments, the present invention provides a method for manufacturing a carbon reinforced composite separator for a fuel cell and a method for manufacturing the same, in which an additional post-treatment is performed to remove residual resin (including other residues) remaining on the surface of a carbon reinforced composite separator, which is manufactured by an ordinary process, preferably by plasma etching.

In preferred embodiments of the present invention, as the post-treatment for the carbon reinforced composite separator, the plasma etching is additionally performed on the surface of the separator using plasma to reduce the electrical contact resistance of the carbon reinforced composite separator.

According preferred embodiments of the present invention, a liquid phase resin for gasket is suitably applied to the surface of the carbon reinforced composite separator along a predetermined gasket pattern, or a semi-cured resin for gasket in the form of a film with a predetermined gasket pattern is suitably stacked on the surface of the carbon reinforced composite separator, and then the plasma etching is suitably performed to remove the residual resin and, at the same time, cure the resin for gasket.

In a process of manufacturing a carbon reinforced composite separator integrated with a gasket for maintaining airtightness, if the removal of the residual resin and the curing of the resin for gasket are simultaneously made by the plasma etching, it is possible to suitably reduce the overall processing time to improve the productivity, and further it is possible to suitably prevent the composite material of the separator from being damaged.

According to preferred embodiments of the present invention, the carbon reinforced composite material is meant to refer to a composite material reinforced with a conductive carbon material, i.e., a composite material containing a polymer resin such as epoxy as a matrix and at least one conductive carbon material such as continuous carbon fibers, chopped carbon fibers, carbon nanotubes, and carbon black.

According to other further preferred embodiments of the present invention, the post-treatment, in which the plasma etching is suitably performed on the surface of the carbon reinforced composite separator, is added to the manufacturing method of the present invention, and thus any process of manufacturing the carbon reinforced composite separator, which is to be performed before the plasma etching, may be suitably employed without limitation. For example, in certain exemplary embodiments, the carbon reinforced composite separator may be manufactured in a mold or by a continuous process for mass production disclosed in Korean Patent Publication No. 10-2009-0112771, incorporated by reference in its entirety herein, and filed by the applicant of the present invention.

Figure 3:
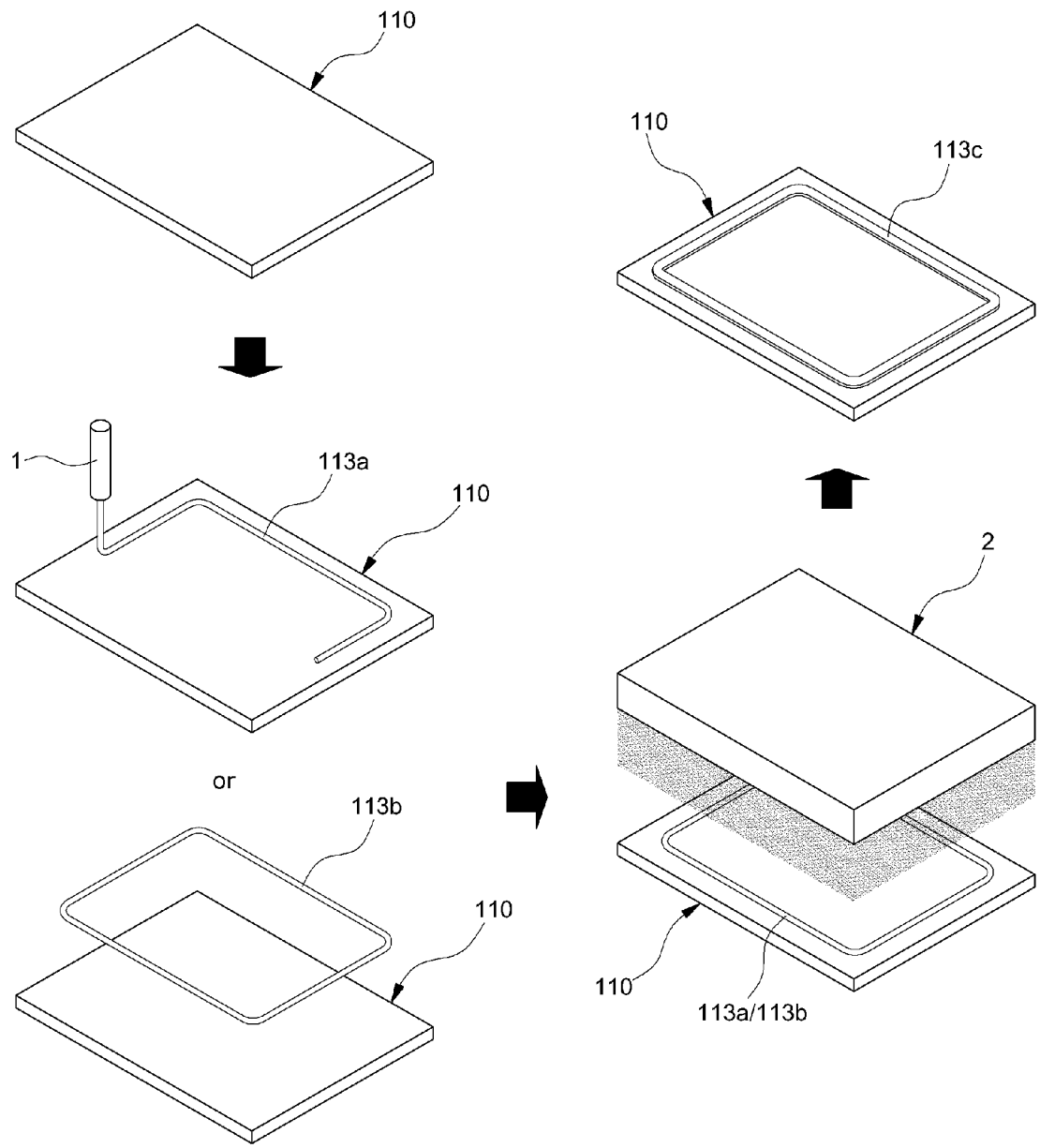
FIG. 3 is a process diagram showing a process for manufacturing a separator integrated with a gasket for maintaining airtightness by plasma etching according to the present invention.

According to further preferred exemplary embodiment, for example as shown in FIG. 3, FIG. 3 is a process diagram showing a process for manufacturing a separator integrated with a gasket for maintaining airtightness by plasma etching. As shown in FIG. 3, a carbon reinforced composite separator 110 is suitably prepared by an ordinary process, and a resin for gasket 113a or 113b before curing is preferably stacked on the surface of the separator along a gasket pattern, where a gasket is to be suitably positioned, before the plasma etching.

Preferably, in the case where a liquid phase resin for gasket is used, the liquid phase resin 113a is suitably applied to the surface of the separator 110, to which a gas diffusion layer is suitably bonded, along a predetermined gasket pattern, where the gasket is to be positioned, using resin injection equipment.

According to further preferred embodiments, for example as in a case where a semi-cured resin for gasket is used, the semi-cured resin 113 in the form of a film with a predetermined gasket pattern is suitably stacked on the surface of the separator 110.

In further preferred exemplary embodiments, the above-described liquid phase or semi-cured resin should preferably be selected from materials, which can be cured by plasma, among the materials used for gaskets, and a polyurethane or silicon resin may preferably be used.

Upon completion of this process, the separator is suitably fixed in a reaction chamber of plasma equipment, and then the plasma etching is suitably performed by injecting an atmospheric gas into the reaction chamber and allowing a plasma generator 2 to generate plasma. Accordingly, as a result, the residual resin and other residues are removed from the surface of the separator and, at the same time, the resin for gasket is completely cured, thus completing the final composite separator integrated with the gasket 113c.

Accordingly, according to the present invention, the plasma etching is performed to reduce the electrical contact resistance over the entire surface of the composite separator and cure the resin for gasket using plasma energy. In certain exemplary embodiments, for example as in the case where the plasma energy is used, it is possible to completely cure the polyurethane or silicon resin for a short time of 10 minutes.

Figure 4:
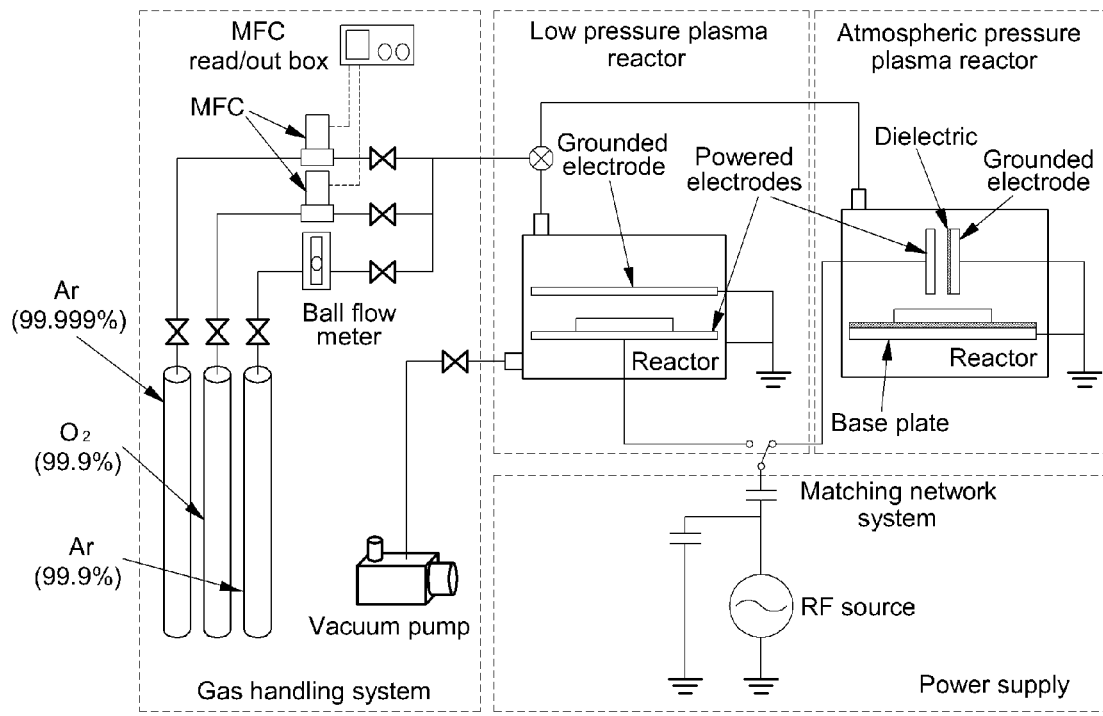
FIG. 4 is a schematic diagram showing an example of RF plasma equipment used in the present invention.

In certain embodiments of the present invention, RF plasma equipment well-known to one of skill in the art may be used to perform the plasma etching. According to certain preferred embodiments and as shown in FIG. 4, for example, FIG. 4 is a schematic diagram showing an example of RF plasma equipment which can be used in the present invention. Preferably, the RF plasma equipment of FIG. 4 includes a low pressure plasma reactor and an atmospheric pressure plasma chamber.

Figure 5:
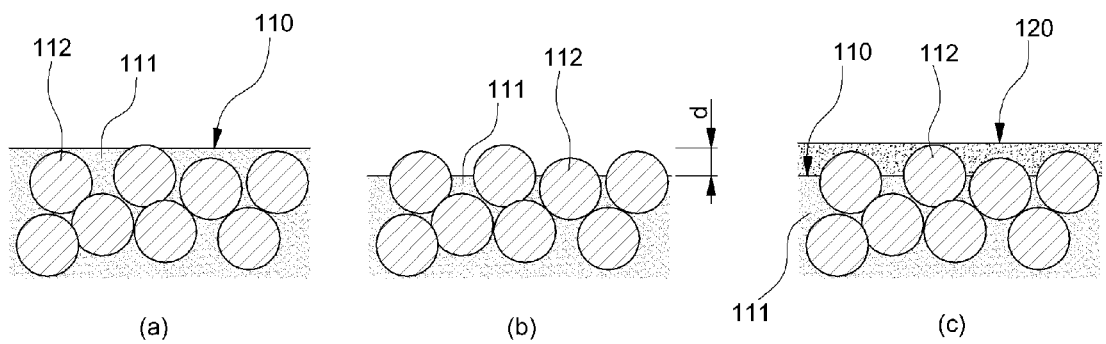
FIG. 5 is a schematic diagram showing a state in which residual resin and other residues remaining on the surface of the composite separator are removed according to the present invention.

According to further preferred embodiments, a state in which the residual resin and other residues remaining on the surface of the carbon reinforced composite separator are selectively removed using plasma is schematically shown in FIG. 5.

Referring to FIG. 5, (a) shows a cross-sectional structure of the composite separator in which continuous carbon fibers are bound by epoxy resin, and (b) shows a state in which the plasma etching is performed on the surface of the separator to remove the residual resin and residues from the surface other than the continuous carbon fibers.

In certain exemplary embodiments, in FIG. 5, (c) shows a state in which a gas diffusion layer (GDL) 120 formed of a porous material (e.g., carbon paper or carbon felt) is positioned on the separator 110, in which the contact area between the separator 110 and the GDL 120 is suitably increased, and thus the electrical contact resistance therebetween is suitably reduced.

As such, according to the present invention, the conductive carbon material is suitably exposed by performing the plasma etching to remove the residual resin, and thus the electrical contact resistance of the separator is reduced.

The inventor of the present invention has experimentally confirmed that when the plasma etching is performed on the surface of the continuous carbon fiber composite separator, the residual resin can be selectively removed from the surface of the separator, described herein below.

First, a specimen was prepared from the continuous carbon fiber composite separator and the plasma etching was performed while varying the plasma treatment time to compare the state in which the residual resin was removed.

According to certain exemplary embodiments, as the material for the separator, a PAN based carbon fiber prepreg (SK Chemical, Korea, USN 020, stacking sequences: $[0_2/30/-30/45/-45/90]_S$) as a continuous carbon fiber composite containing epoxy resin as a matrix was used.

In certain preferred embodiments, argon was used as an atmospheric gas in the RF plasma equipment, and the plasma etching was performed at an argon flow rate of 10 l/min and at an RF power of 120 W (13/56 MHz).

Figure 6:
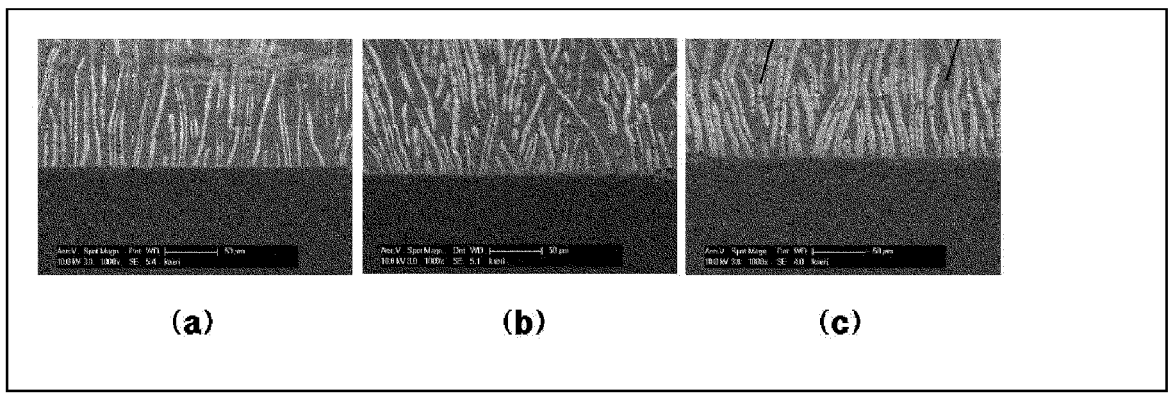
FIG. 6 shows electron microscope images of the surface of a specimen according to the present invention.
Figure 7:
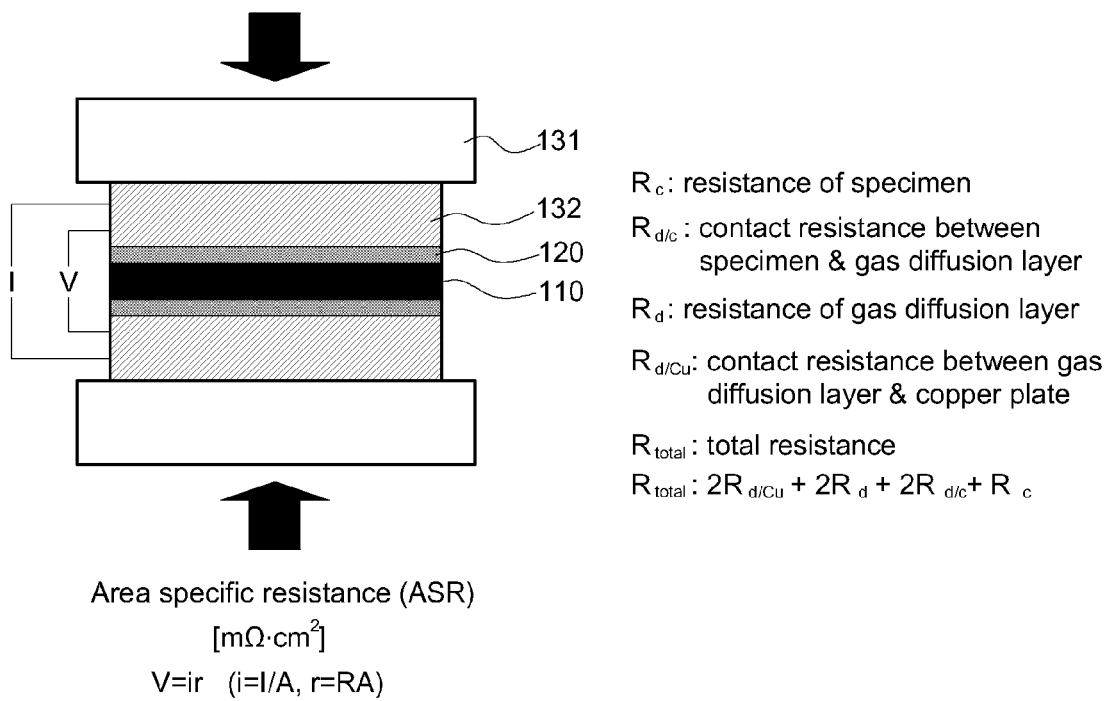
FIG. 7 is a schematic diagram showing a method for measuring electrical contact resistance of a separator specimen according to the present invention.

According to certain exemplary embodiments and as shown in FIG. 6, for example, FIG. 6 shows electron microscope images of the surface of 'P' area of a specimen, in which (a) shows a state before the plasma etching, (b) shows a state after the plasma etching is performed for a treatment time of 1.5 min., and (c) shows a state after the plasma etching is performed for a treatment time of 6 min.

As can be seen from FIG. 6, as the treatment time is suitably increased, the area ratio of the fibers exposed to the specimen surface is increased.

As such, the electrical contact resistance $R_{total}$, i.e., area specific resistance (ASR, $\Omega \cdot cm^2$), was measured in such a manner that a gas diffusion layer 120 was disposed on a copper plate 132 attached to the inside of each of upper and lower insulating plates 131, a separator specimen 110 was interposed between the upper and lower gas diffusion layers 120, and the resulting structure was fixed by applying a predetermined clamping force.

Figure 8:
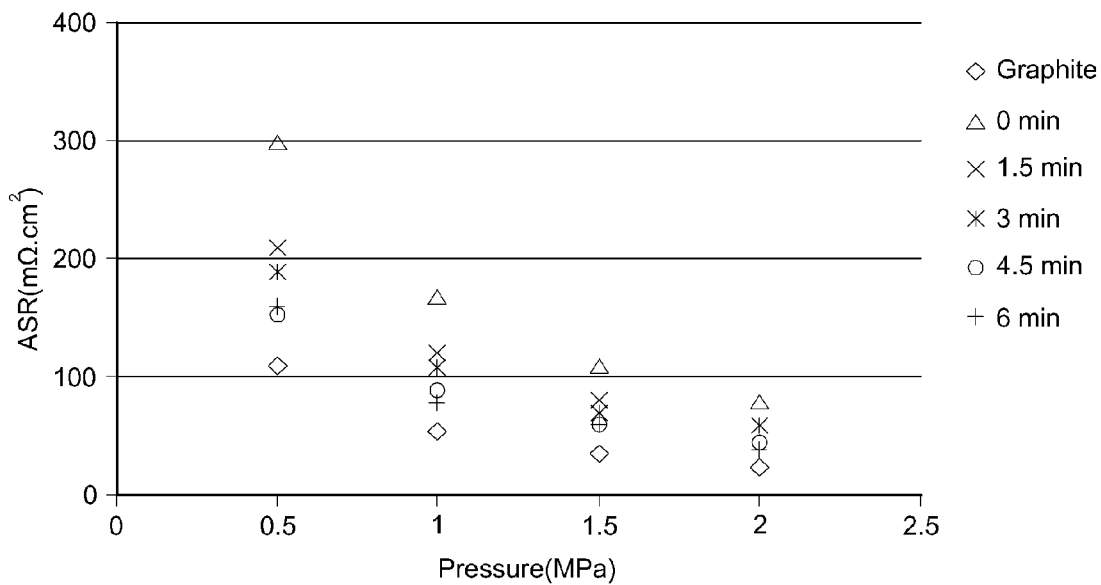
FIG. 8 is a graph showing the electrical contact resistance of separator specimens according to the present invention.

For comparison, a graphite specimen and separator specimens formed of the same material and subjected to the plasma etching under the same conditions for a treatment time of 3, 5, 7, and 10 minutes, respectively, were added, and the results are shown in FIG. 8.

As can be seen from FIG. 8, ASR (area specific resistance) in the thickness direction including the contact and bulk resistance of the composite separator after the surface treatment was reduced by more than 70 percent, compared to the composite separator before the surface treatment, and as the treatment time was increased at an appropriate clamping pressure, the resistance was significantly reduced. When the plasma etching time was increased to 10 minutes, during which the resin for gasket was completed cured, it was possible to fix the gasket to the separator by the plasma etching.

Figure 9:
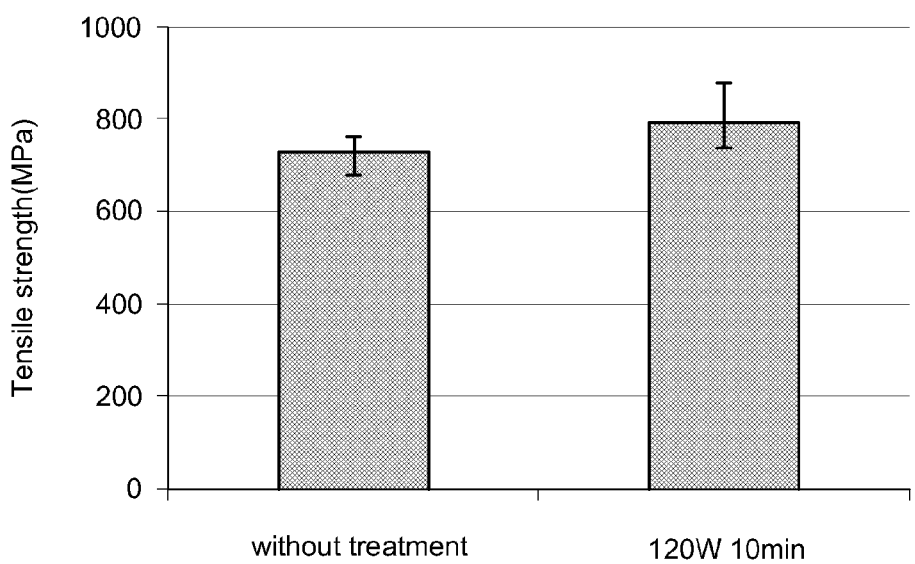
FIG. 9 is a graph showing a change in strength of separator specimens according to the present invention.

In further embodiments of the present invention, the inventor has experimentally determined whether or not the internal strength of the composite matrix was changed. Tensile strength of the specimen without plasma etching and that of the specimen with plasma etching were measured according to the ASTM D3039 standard tensile test, and the results are shown in FIG. 9. The left side of FIG. 9 represents the measurement value of the specimen without plasma etching, and the right side represents the measurement value of the specimen with plasma etching. When the plasma etching was performed at an RF power of 120 W for about 10 minutes in the RF plasma equipment, there was no change in the tensile strength. Although it is seen that the tensile strength is somewhat increased in the graph, it can be seen that it falls within the margin of error.

Furthermore, in other further preferred embodiments, the inventor has experimentally confirmed that the resin for gasket can be completely cured on the surface of the separator by the plasma etching. That is, the plasma etching was performed on polyurethane glue (Hexcel) and silicon (HS-1415, Shinetsu) as the resin for gasket under the same conditions except for the power (in the same RF plasma equipment, at the atmospheric pressure, at an Ar flow rate of 10 l/min, and at an RF power of 120 W (polyurethane glue) & 150 W (silicon) at 13.56 MHz).

Figure 10:
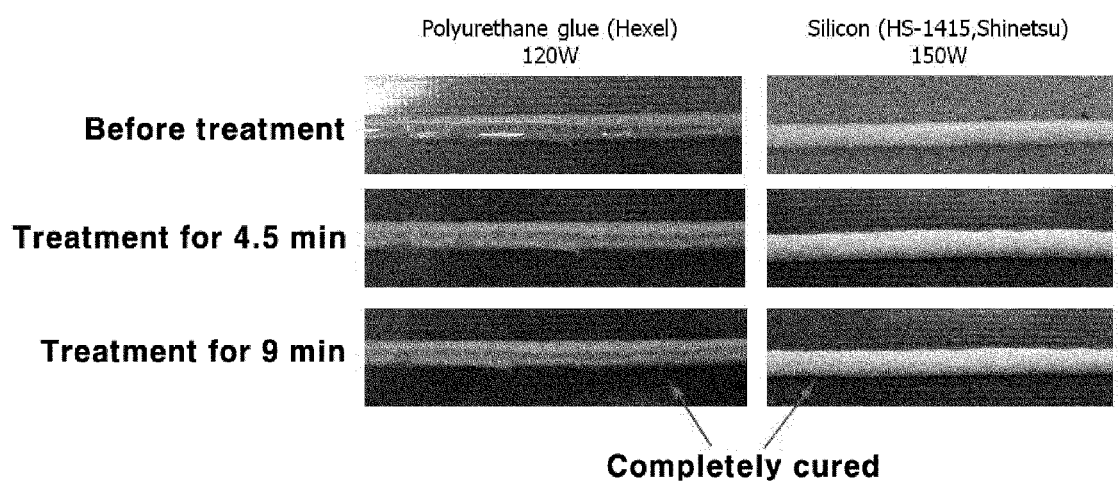
FIG. 10 shows images of resins for gasket before and after plasma treatment according to the present invention.

According to certain exemplary embodiments and as shown in FIG. 10, for example, FIG. 10 shows images of resins for gasket before and after plasma treatment, from which it can be seen that all of the two types of resins are completely cured after about 9 minutes.

As described above, according to the composite separator for the fuel cell and its manufacturing method of the present invention, in which an additional post-treatment is performed to remove residual resin remaining on the surface of the composite separator, which is manufactured by an ordinary process, by plasma etching, and thus it is possible to reduce the electrical contact resistance, thereby improving the performance and efficiency of the fuel cell.

Moreover, according to the present invention as described herein, a liquid phase resin for gasket is suitably applied to the surface of the composite separator along a predetermined gasket pattern, or a semi-cured resin for gasket in the form of a film with a predetermined gasket pattern is stacked on the surface of the composite separator, and then the plasma etching is suitably performed to remove the residual resin and, at the same time, cure the resin for gasket, thus reducing the overall processing time to improve the productivity and preventing a composite material of the separator from being damaged.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a carbon reinforced separator for a fuel cell, the composite separator consisting of a polymer resin as a matrix and reinforced with a carbon material, the method comprising:

performing a post-treatment to expose the carbon material from the surface of the carbon reinforced composite separator while removing residual resin of the polymer resin used as the matrix from the surface of the separator other than the carbon material by performing plasma etching on the surface of the separator by plasma equipment, thereby reducing the electrical contact resistance of the composite separator, wherein the plasma etching is performed after stacking a resin for a gasket on the surface of the carbon reinforced composite separator along a predetermined gasket pattern, wherein a gasket for maintaining airtightness is to be positioned, such that the resin for the gasket is cured by plasma energy together with the removal of the residual resin during the plasma etching.

2. The method of claim 1, wherein the plasma etching is performed after applying a liquid phase resin for the gasket to the surface of the carbon reinforced composite separator along the gasket pattern such that the resin for the gasket is cured.

3. The method of claim 1, wherein the resin for the gasket is a semi-cured resin in the form of a film and the resin for the gasket is completely cured during the plasma etching.

4. The method of claim 1, wherein the carbon material comprises at least one selected from the group consisting of continuous carbon fiber, chopped carbon fibers, carbon nanotubes, and carbon black.

* * * * *